United States Patent [19]
Ivers et al.

[11] Patent Number: 5,210,672
[45] Date of Patent: May 11, 1993

[54] MAGNETICALLY INDELIBLE MEDIA TYPE IDENTIFICATION SYSTEM

[75] Inventors: Michael L. Ivers, San Jose; Andrew M. Rose, Mountain View; Alton B. Otis, Jr., San Francisco, all of Calif.

[73] Assignee: Insite Peripherals, Inc., San Jose, Calif.

[21] Appl. No.: 612,095

[22] Filed: Nov. 9, 1990

[51] Int. Cl.⁵ .............................................. G11B 5/82
[52] U.S. Cl. ...................................... 360/135; 360/25; 360/69; 360/133; 369/52; 369/116
[58] Field of Search ............... 360/69, 65, 25, 77.03, 360/133, 135; 369/59, 116

[56] References Cited

U.S. PATENT DOCUMENTS

| | | | |
|---|---|---|---|
| 4,688,203 | 8/1987 | Koishi | 369/116 X |
| 4,791,622 | 12/1988 | Clay | 369/59 |
| 5,050,144 | 9/1991 | Henderson | 369/44.26 X |
| 5,075,805 | 12/1991 | Peddle | 360/61 |

*Primary Examiner*—A. J. Heine
*Attorney, Agent, or Firm*—Thomas E. Schatzel

[57] ABSTRACT

A diskette comprising a jacket, a liner material disposed within said jacket, a flat circular media having a magnetic coating on both sides disposed within said liner material, a hub attached at the center of said media, a plurality of optical positioning tracks on at least one of said sides of said media, and a media type code optically embossed on at least one of said sides of said media. The media type code contains information about the physical properties of the particular diskette that will allow a disk drive unit to auto-configure itself to allow optimum data communication and performance.

7 Claims, 2 Drawing Sheets

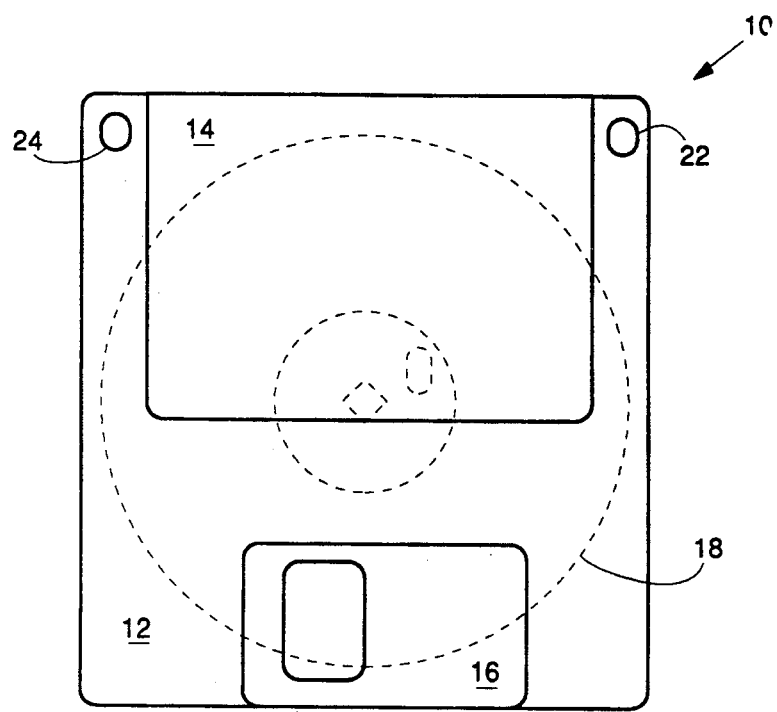
Fig_1(a)
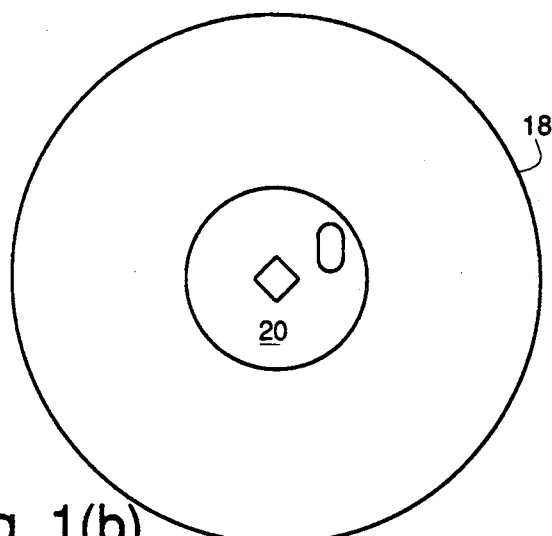
Fig. 1(b)
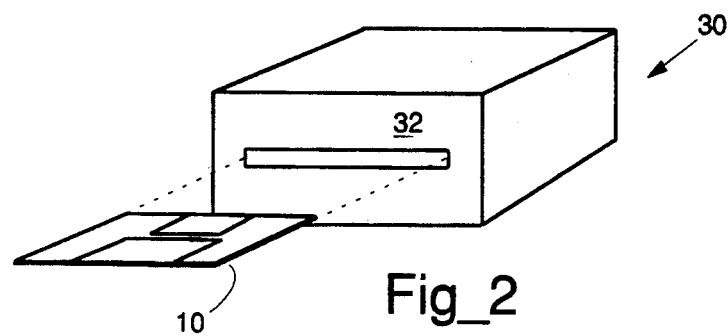
Fig_2

MAGNETICALLY INDELIBLE MEDIA TYPE IDENTIFICATION SYSTEM

BACKGROUND OF THE INVENTION

1. Field of the Invention

The invention relates generally to magnetic disk drives and more specifically to high density removable media used in computer systems.

2. Description of the Prior Art

Continual advances in floppy disk technology have allowed the rapid migration from eight inch, to 5.25 inch to 3.5 inch diskettes. Originally, 5.25 inch diskettes held only 360K bytes of data, but higher track and more efficient recording formats have allowed the smaller 3.5 inch diskette to store as much as 1.44M bytes in the recent high density (HD) format. Such rapid migration has caused severe interoperability concerns, because of the physical incompatibility between the traditional formats. The recent HD format is a ray of hope that the situation will improve, in that both Apple Macintosh IIs and IBM-PCs equipped with HD drives record in basically an interchangeable format.

Advances in floppy disk technology have not stayed still. By embedding optical servo information in an otherwise standard 3.5 inch micro-floppy diskette, storage capacities of twenty megabytes and beyond are possible. The Micro Standards Committee, sponsored by the Microcomputer Managers Association, announced at COMDEX/Spring 1989 a 10-month study of proposed new formats to replace the aging 1.44M byte diskette. (See, "Draft White Paper on a New Standard for Very-High-Density Diskette Drives," Feb. 5, 1990, published by the Micro Standards Committee, 50 W. 34th St., Suite 23C7, New York, N.Y. 10001.) The result was to recommend a 20.9M byte optical-magnetic format that was judged to be superior on every criterion rated.

In the prior art, only two devices have been used on diskettes to signal to a drive special properties of the diskette. Both have been mechanical. The original eight inch floppy disks had a notch in the jacket that was covered to prohibit writing on the disk. Some diskettes have a mechanical switch that allows/prohibits writing. The latest HD micro-floppy diskettes have a hole to differentiate them to the disk drive from earlier 400K byte (Apple), 722K byte (IBM), or 800K byte (Apple) 3.5 inch diskettes. The 2.88M byte industry format has a capacity hole in yet a different location than the 1.44M byte diskette. To guard against improper formatting a drive should have three switches, one for write protect and two to detect capacity. Other than that, the prior art has not placed any information on the recording surface of a diskette to allow the disk drive to auto-configure itself to the particular diskette inserted.

SUMMARY OF THE PRESENT INVENTION

It is therefore an object of the present invention to provide a media type code to identify the various physical properties of a particular removable diskette.

Briefly, an embodiment of the present invention is a diskette comprising a jacket, a liner material disposed within said jacket, a flat circular media having a magnetic coating on both sides disposed within said liner material, a hub attached at the center of said media, a plurality of optical positioning tracks on at least one of said sides of said media, and a media type code embossed on at least one of said sides of said media and detectable by a magnetic read/write head.

An advantage of the present invention is that a disk drive can automatically configure itself to the particular type of diskette inserted out of a possible field of a plurality of possible types.

Another advantage of the present invention is that special coating formulations on a diskette can be indicated to a disk drive.

Another advantage of the present invention is that a twenty megabyte diskette can be constructed that is compatible with prior art 720K and 1.44M byte 3.5 inch diskettes.

Another advantage of the present invention is that individual data tracks of a diskette can be write protected.

These and many other objects and advantages of the present invention will no doubt become obvious to those of ordinary skill in the art after having read the following detailed description of the preferred embodiments which are illustrated in the various drawing figures.

IN THE DRAWINGS

FIG. 1(a) is an elevational view of a diskette showing the flat circular media inside with dotted lines. FIG. 1(b) is an elevational view of the flat circular media with the jacket and liner removed from the diskette of FIG. 1(a);

FIG. 2 is a disk drive having the diskette of FIG. 1(a) inserted into it;

DETAILED DESCRIPTION OF THE PREFERRED EMBODIMENTS

Figure 3:
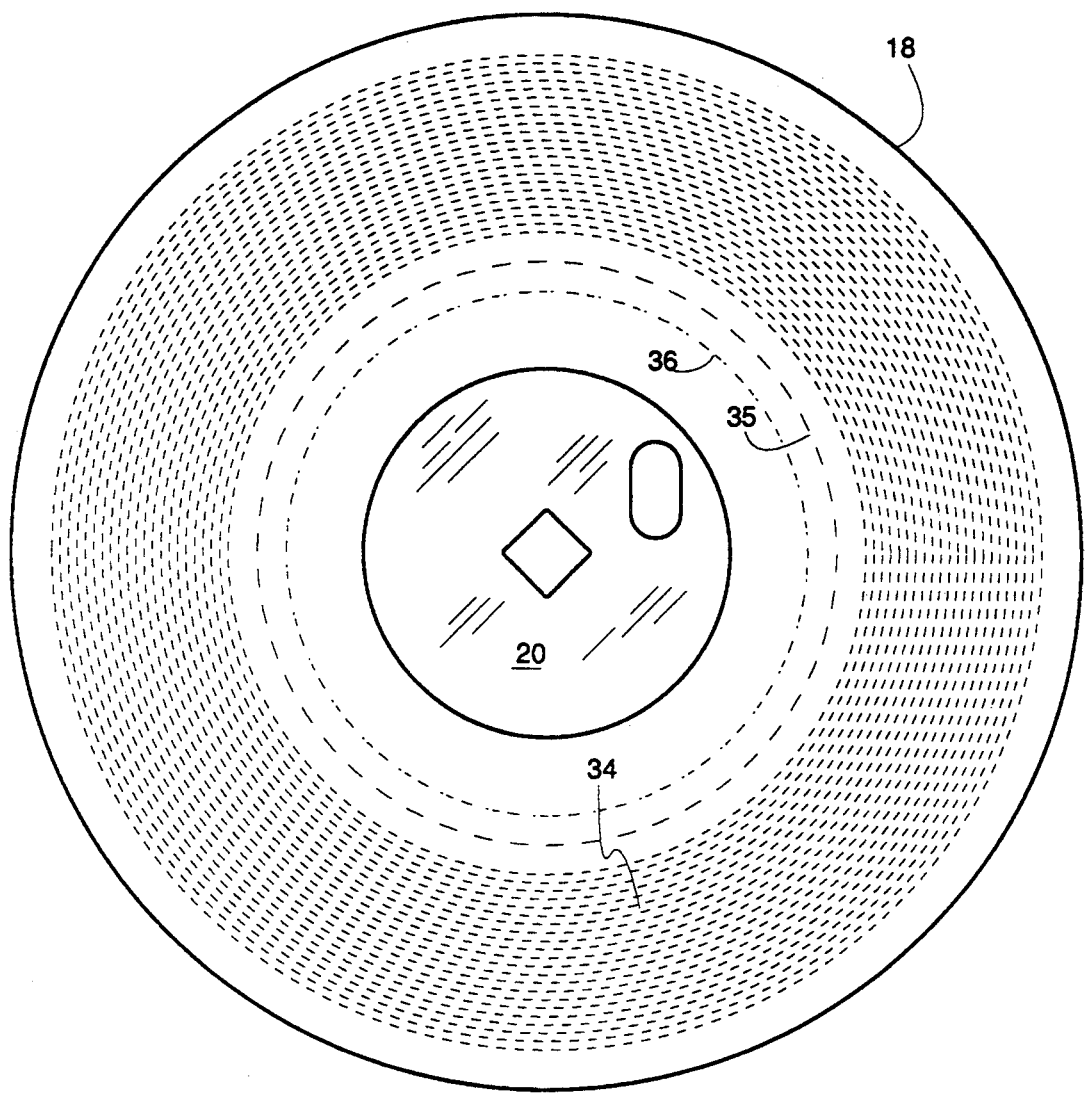
FIG. 3 is another elevational view of the flat circular media within the diskette of FIG. 1(a) showing details of the concentric data tracks, the reference cylinder, and the media type code track.

FIG. 1(a) is a diskette, referred to by the general reference numeral 10, comprising a jacket 12, a label 14, a shutter 16, and a media 18. A liner is disposed within jacket 12 and is made of a material that lubricates and cleans media 18. (The liner is conventional, and is not described further here.) FIG. 1(b) shows that media 18 is connected at its center to a hub 20. A write-protect notch 22 and a diskette density notch 24 provide basic information about diskette 10 to a disk drive (described below). Media 18 is flat and circular and has magnetic coatings on its two surfaces. Preferably, media 18 is coated with barium ferrite. (Coatings of ferric oxide will work, but not as well as barium ferrite.)

FIG. 2 is a disk drive system, referred to by the general reference numeral 30, comprising an optical-magnetic disk drive 32 and diskette 10. Disk drive 32 positions its heads according to optical servo information and reads and writes data magnetically. If disk drive 32 senses that a slider (not shown) within write protect notch 22 is in a first position, then disk drive 32 will not attempt to write any data on diskette 10. If disk drive 32 senses that the slider in write protect notch 22 is in a second position, then disk drive 32 will be enabled to write data on diskette 10. The presence of diskette density notch 24 indicates to disk drive 32 that diskette 10 is a "high density" disk. The absence of diskette density notch 24 indicates to disk drive 32 that diskette 10 is not a "high density" disk. Media 18 is preferably spun within diskette 10 by disk drive 32 at 720 revolutions per minute (RPM). Preferably, disk drive 32 is downwardly compatible with conventional 720K byte and 1.4M byte 3.5 inch micro-floppy diskettes. Such downward compatibility would allow a computer attached to disk drive 32 to use new 20.9M byte very high density (VHD) diskettes, 1.44M byte HD diskettes, and 720K byte diskettes.

FIG. 3 shows that media 18 is comprised of a plurality of concentric (magnetic) data and (optical) servo tracks 34, a reference cylinder 35, and a track 36. Track 36 comprises a media type code (MTC) 38 that is a permanent feature of media 18, not subject to erasure. Preferably, track 36 is overwritten with a MTC magnetic track that repeats magnetically the same information as MTC 38 which is indelibly embossed in track 36. The MTC magnetic track is located at the point a magnetic read/write head detects as the centerline of the embossing of track 36. Track 36 is located outside the portion of media 18 reserved for the concentric data tracks and servo tracks 34 and reference cylinder 35. Track 36 can be placed elsewhere on media 18, but the position described here is preferred. Track 36 is substantially at the innermost limit of travel of a set of heads (having magnetic and optical pickups, not shown) within disk drive 32. Preferably, reference cylinder 35 has its centerline at a radius 866,140±50 microinches from the center of hub 20 (and media 18). Reference cylinder 35 is preferably 1,440±20, microinches wide. Track 36 is placed closer to the center of media 18 than cylinder 35, and has its centerline at a radius 863,731±50 microinches from the center of hub 20 (and media 18). Track 36 is preferably 720±20 microinches wide. The centerline of track 36 is preferably 2,409±50 microinches from the centerline of reference cylinder 35. When diskette 10 is initially inserted into disk drive 32, track 36 will be accessed and media type code 38 will be read and used to configure disk drive 32 to a proper operating mode. Reference cylinder 35 and track 36 are preferably indelibly recorded, magnetically detectable tracks. "Zero" bits (false/low) are configured such that the leading portion of the bit consists of 200 microseconds of an unembossed disk surface of 13,025±17 microinches followed by 400 microseconds of an embossed disk surface of 26,049±34 microinches. "One" bits (true/high) are configured such that the leading portion of the bit consists of 400 microseconds of an unembossed disk surface of 26,049±34 microinches followed by 200 microseconds of embossed disk surface of 13,025±17 microinches. Media 18 is preferably embossed by laser etching or mechanical embossing using a hydraulic press. Although only one track 36 is discussed above, more may be added to accommodate any additional information contained in a large and expanded media type code 38.

Figure 4:
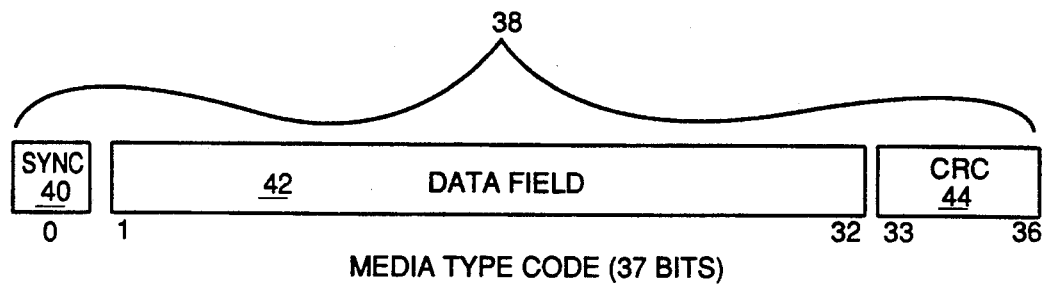
FIG. 4 is a diagram of the 37-bit media type code recorded on the media type code track of the diskette media shown in FIGS. 1-3.

FIG. 4 shows that media track code 38 preferably has three fields: a sync field 40, a data field 42, and a cyclic redundancy check field 44. Data field 42 comprises a 32-bit cell algorithm used to identify specific magnetic, optical, and servo properties of diskette 10 to disk drive 32. (Disk drive 32 will then use these to adjust itself to diskette 10.) Specifically, data field 42 comprises a reserved bits field for carrying data not otherwise defined, a servo code bit field to designate a particular servo system type, a security code bit field to designate particular read/write properties of said media, a magnetic data code bit field to designate the particular magnetic properties of said media, a media type code bit field to identify said media as being of a particular style, a capacity code bit field to designate the storage capacity of said media, and a machine compatibility code bit field. Table I summarizes the preferred number of bits and position of bits in the preferred configuration of media type code 38. Alternatively, media type code comprises a unique diskette serial number that is loaded into the disk drive 32 and available to a computer connected to disk drive 32. The serial number is useful as a key to unlock copy-protected software or to prohibit unauthorized use of computer systems.

TABLE I

| FIELD | BIT # |
|---|---|
| synchronization | 0 |
| reserved | 1-8 |
| servo code | 9-14 |
| security code | 15-16 |
| magnetic data code | 17 |
| diskette type code | 18-20 |
| capacity code | 21-24 |
| machine compatibility | 24-32 |
| cyclic redundancy check | 33-36 |

Diskette 10 has a permanent hole located so that a conventional 720K, 1.44M, or 2.88M drive will regard the diskette as being write protected. This protects from accidental erasure if an operator inserts diskette 10 (formatted for 20M bytes) into a conventional drive. (Diskette 10 will be unreadable by a conventional drive and a user is normally queried by a system whether or not the diskette should be formatted; The system will then attempt to format diskette 10 and this will be prevented by the permanent hole.)

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A very high density diskette comprising:
   a jacket having a liner material disposed within the jacket;
   a flat circular media having two surfaces and a magnetic coating on both of said surfaces, the media disposed within the liner material; and
   a media type code that is magnetically readable and not magnetically erasable on at least one of said surfaces of the media comprising data and for encoding the physical properties of the media important to the proper operation of a disk drive in communication with the media.

2. A media type code that is magnetically detectable but not magnetically erasable recorded on an embossed optical-magnetic media having a first surface area reserved for a plurality of concentric data and servo tracks, said media type code recorded in a second surface area, comprising:
   a synchronization field;
   a data field having a plurality of bit information identifying a plurality of operating characteristics of said media such that a disk drive can adapt itself to a proper interfacing mode to communicate with said media; and a cyclic redundancy code bit field comprising check bits generated from bits within the data field.

3. The media type code of claim 2, wherein the data field comprises:
   a servo code bit field to designate a particular servo system type;
   a security code bit field to designate particular read-/write properties of said media;
   a magnetic data code bit field to designate the particular magnetic properties of said media;
   a media type code bit field to identify said media as being of a particular style;
   a machine compatibility code bit field; and
   a reserved bits field for carrying data in addition to said servo code, said security code, said magnetic data code, said media type code, and said machine compatibility code.

4. The media type code of claim 2, wherein the data field further comprises:
   a media serial number bit field.

5. The media type code of claim 2, wherein:
   said media type code is indelibly recorded on said media by a mechanical process by which groove-like features are placed on said second surface area.

6. The media type code of claim 2, wherein:
   the synchronization field comprises one bit of data;
   the data field comprises 32 bits of data; and
   the cyclic redundancy code bit field comprises four bits of data.

7. A 3.5 inch micro-floppy diskette for storing in excess of twenty megabytes of data having a jacket, a liner, and a flat circular optical-magnetic media having a center point of reference and two surfaces, said media comprising:
   a plurality of concentric data tracks and servo tracks on a first portion of at least one surface of said media;
   a reference cylinder embossed on a second portion of at least one of said surfaces and along a centerline radius 866,140±50 microinches from said center point of reference and being 1,440±20 microinches wide;
   a media type code track embossed on a third portion of at least one of said surfaces and along a centerline radius 863,731±50 microinches from said center point of reference and being 720±20 microinches wide, said centerline of the media type code track being 2.409±50 microinches from said centerline of the reference cylinder, the media type code track comprising a media type code having "zero" bits configured such that the leading portion of the bit consists of an unembossed disk surface of 13,025±17 microinches followed by an embossed disk surface of 26,049±34 microinches, and having "one" bits configured such that the leading portion of the bit consists of an unembossed disk surface of 26,049±34 microinches followed by an embossed disk surface of 13,025±17 microinches.

* * * * *